United States Patent
Haubold et al.

(10) Patent No.: US 10,970,200 B2
(45) Date of Patent: Apr. 6, 2021

(54) TEST RESULT TRIAGE FOR A FAILED CODE VALIDATION

(71) Applicant: Microsoft Technology Licensing, LLC, Redmond, WA (US)

(72) Inventors: Jeremy Haubold, Portage, IN (US); Jessica Priscila de Sousa Santos, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/245,687

(22) Filed: Jan. 11, 2019

(65) Prior Publication Data
US 2020/0226056 A1    Jul. 16, 2020

(51) Int. Cl.
*G06F 11/36* (2006.01)
*G06F 11/07* (2006.01)

(52) U.S. Cl.
CPC ...... *G06F 11/3692* (2013.01); *G06F 11/0793* (2013.01); *G06F 11/3688* (2013.01)

(58) Field of Classification Search
CPC .............. G06F 11/0718; G06F 11/0793; G06F 11/3636; G06F 11/3688; G06F 11/3692
See application file for complete search history.

(56) References Cited

U.S. PATENT DOCUMENTS

| | | | | |
|---|---|---|---|---|
| 8,930,761 | B2* | 1/2015 | Masser | G06F 11/3692 714/37 |
| 8,959,400 | B2* | 2/2015 | Miyazaki | G06F 11/0793 714/45 |
| 9,311,220 | B1 | 4/2016 | Ha et al. | |
| 9,710,364 | B2 | 7/2017 | Herzig et al. | |
| 10,282,275 | B2* | 5/2019 | Rivera | G06F 8/43 |
| 10,496,459 | B2* | 12/2019 | Yoshida | G06F 11/0706 |
| 2007/0245313 | A1 | 10/2007 | Hardy et al. | |
| 2009/0307763 | A1 | 12/2009 | Rawlins et al. | |
| 2016/0179607 | A1 | 6/2016 | Kulkarni et al. | |
| 2018/0300229 | A1 | 10/2018 | Kornfeld et al. | |

FOREIGN PATENT DOCUMENTS

WO        0208903 A2     1/2002

OTHER PUBLICATIONS

Bell, et al., "DeFlaker: Automatically Detecting Flaky Tests", In Proceedings of the ACM/IEEE 40th International Conference on Software Engineering, May 27, 2018, 12 Pages.

(Continued)

*Primary Examiner* — Joseph R Kudirka

(57) ABSTRACT

Systems, methods, and software are disclosed herein for triaging test results of a failed code validation. Test results are received indicative of a failed code validation performed in a client device. Failure data is generated from the test results indicating one or more failure modes which occurred during the failed code validation. A follow-up action associated with each of the one or more failure modes is then determined by comparing each of the one or more failure modes to previously identified failure modes. Instructions are communicated to the client device based on the determined follow-up action associated with each of the one or more failure modes.

20 Claims, 7 Drawing Sheets

(56) References Cited

OTHER PUBLICATIONS

Bhojan, et al., "A Machine Learning Based Approach for Detecting Non-Deterministic Tests and Its Analysis in Mobile Application Testing", In International Journal of Advanced Research in Computer Science, vol. 9, Issue 1, Jan. 2018, pp. 219-223.

Micco, John, "Flaky Tests at Google and How We Mitigate Them", Retrieved from https://testing.googleblog.com/2016/05/flaky-tests-at-google-and-how-we.html, May 27, 2016, 4 Pages.

"International Search Report and Written Opinion Issued in PCT Application No. PCT/US2019/069025", dated Apr. 21, 2020, 12 Pages.

Tene, Ran, "How We're Winning the Battle Against Flaky Tests", Retrieved from https://web.archive.org/web/20180516180139/https://blogs.dropbox.com/tech/2018/05/how-were-winning-the-battle-against-flaky-tests/, May 16, 2018, 9 Pages.

* cited by examiner

TEST RESULT TRIAGE FOR A FAILED CODE VALIDATION

TECHNICAL FIELD

Aspects of the disclosure are related to computing hardware and software technology, and in particular to triage test results of a failed code validation.

TECHNICAL BACKGROUND

Modern electronic devices such as computers, tablets, mobile phones, wearable devices and the like have become a common part of modern life. Many users of electronic devices routinely utilize various types of software applications for business and personal activities. Examples of software applications can include word processors, spreadsheet applications, e-mail clients, notetaking software, presentation applications, games, computational software, and others. These software applications can also be used to perform calculations, produce charts, organize data, receive and send e-mails, communicate in real-time with others, and the like. The software applications can range from simple software to very complex software.

The development of complex software is often performed by teams of software developers. Tests are typically run against a controlled environment when software code has been added or modified. These tests provide feedback on whether the output of the code is as expected and repeatable. If the test passes, the test indicates that there are no issues with the code. If the test passes, the test indicates that the code contains bugs.

In many cases, tests may fail for undetermined reasons which may not be related to the code configuration, such as a delayed virtual machine, poor network connection, a timeout, a security validation failure, etc. These nondeterministic tests (also referred to as flaky tests) generally require extensive developer resources to investigate and triage the failures which have occurred during the test. Furthermore, a test failure generally includes multiple different failure modes which require different responses. For example, one failure mode might be the result of a poor network connection which merely requires a retry of the test. However, another failure mode might be the result of a hard failure which should never be retried.

Prior solutions to this problem include maintaining basic data on whether a test has a basic nondeterministic status, i.e., flaky status. However, this solution does not provide any feedback on what the different failure modes were. Each of these failure modes may have a root cause. However, the test is not determined to be nondeterministic until developers manually parse the code and determine that there were no issues with the code when the test failed. Unfortunately, prior solutions require many resources to merely determine that the test was nondeterministic without any additional information on what the various failure modes were, let alone how to respond to the various failure modes.

Furthermore, the prior solutions treated all test cases having the same name identically. This can be highly inefficient when running testcases with the same name in various environment. For example, a testcase run on an Operating System (OS) generally has different failure modes than a testcase with the same name run on a Central Processing Unit (CPU) architecture. Unfortunately, prior solutions did not treat these failure modes as distinct for testcases having the same name but run in different environments. This limits an ability of the application to enhance a developer's experience when investigating and responding to failed code tests.

OVERVIEW

An enhanced system, method, and software application is disclosed herein that improves triaging test results of a failed code validation. Test results are received indicative of a failed code validation performed in a client device. Failure data is generated from the test results indicating one or more failure modes which occurred during the failed code validation. A follow-up action associated with each of the one or more failure modes is then determined by comparing each of the one or more failure modes to previously identified failure modes. Instructions are communicated to the client device based on the determined follow-up action associated with each of the one or more failure modes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DESCRIPTION

Examples of the present disclosure describe an application for triaging test results of a failed code validation. Test results are received indicative of a failed code validation performed in a client device. Failure data is generated from the test results indicating one or more failure modes which occurred during the failed code validation. A follow-up action associated with each of the one or more failure modes is then determined by comparing each of the one or more failure modes to previously identified failure modes. Instructions are communicated to the client device based on the determined follow-up action associated with each of the one or more failure modes.

A technical effect that may be appreciated from the present discussion is the increased efficiency in automatically investigating multiple failure modes in a failed test. The application described herein also improves the efficiency in determining whether the failure modes are known and if so, how to they should optimally be responded to, such as by blocking retries or by allowing retries. Advantageously, the developers do not need to manually parse the test results to determine the reason for the test failure and what the various test failures are, which may take a considerable amount of time when a high volume of failure modes have occurred.

Figure 1:
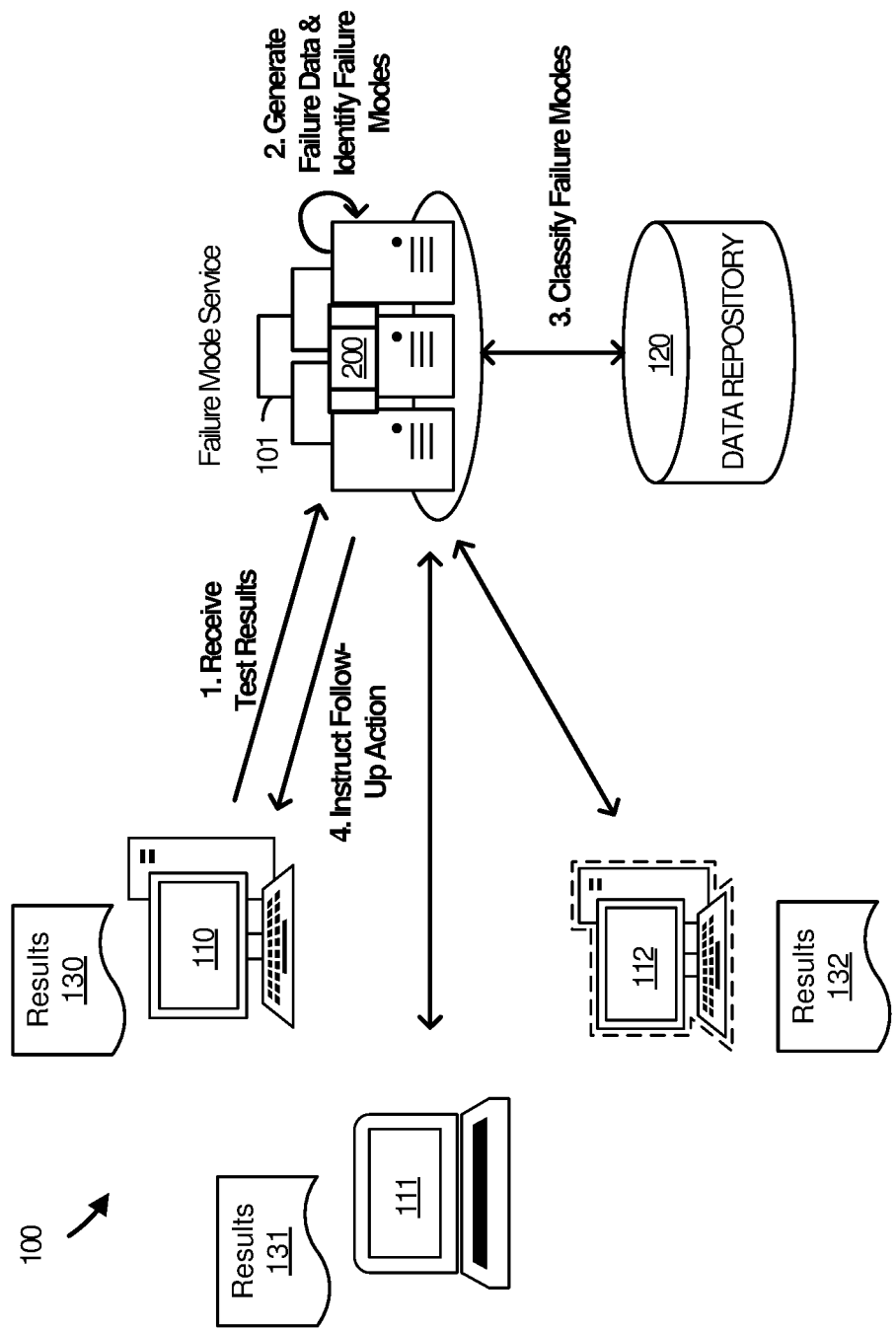
FIG. 1 illustrates an operational architecture for implementing an enhanced application to triage test results of a failed code validation.

Referring to the drawings, FIG. 1 illustrates an exemplary operational architecture 100 related to processing operations for management of an exemplary enhanced system with which aspects of the present disclosure may be practiced. Operational architecture 100 includes failure mode service 101 connected to client devices 110-112. Failure mode service 101 is also connected to data repository 120. Failure mode service 101 also includes a failure triage process 200.

Figure 7:
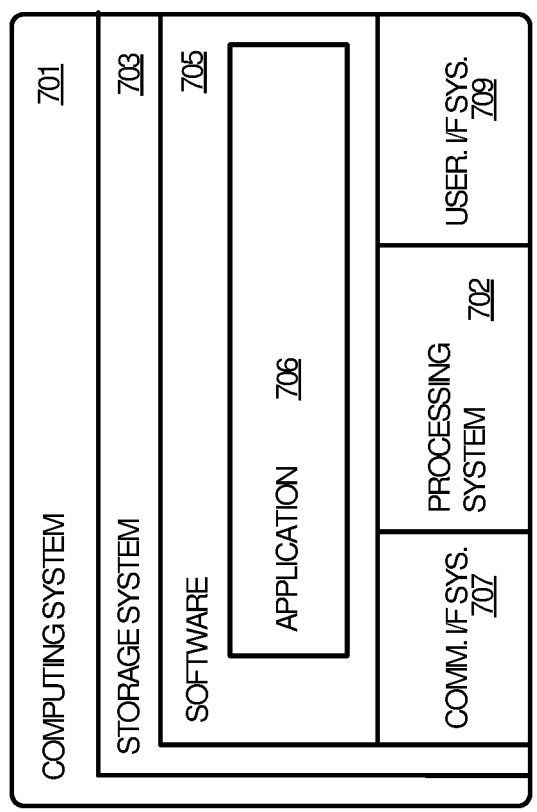
FIG. 7 illustrates a computing system suitable for implementing the technology disclosed herein, including any of the architectures, processes, operational scenarios, and operational sequences illustrated in the Figures and discussed below in the Technical Description.

Failure mode service 101 provides an organizational presence for triaging test results of a failed code validation in a software application. Failure mode service 101 may receive test results from client devices 110-112. Failure mode service 101 may also query data repository 120 for known failure modes and their associated follow-up actions. Failure mode service 101 may be implemented on one or more computing systems, of which computing system 700 in FIG. 7 is representative. Failure mode service 101 provides improvements to efficiency in that the various failure modes included in test results may be automatically identified and triaged using previous failure mode data. Failure mode service 101 additionally improves the efficiency in automatically determining how to respond to each failure mode to in an optimal manner (e.g., allowing or blocking retries).

Failure mode service 101 is representative of any device capable of running an application natively or in the context of a web browser, streaming an application, or executing an application in any other manner Examples of failure mode service 101 include, but are not limited to, servers, personal computers, mobile phones, tablet computers, desktop computers, laptop computers, wearable computing devices, or any other form factor, including any combination of computers or variations thereof. Failure mode service 101 may include various hardware and software elements in a supporting architecture suitable for performing failure triage process 200.

Failure mode service 101 also includes a software application or application component capable of triaging failure modes of a failed test validation in accordance with the processes described herein. The software application may be implemented as a natively installed and executed application, a web application hosted in the context of a browser, a streamed or streaming application, a mobile application, or any variation or combination thereof.

Figure 2:
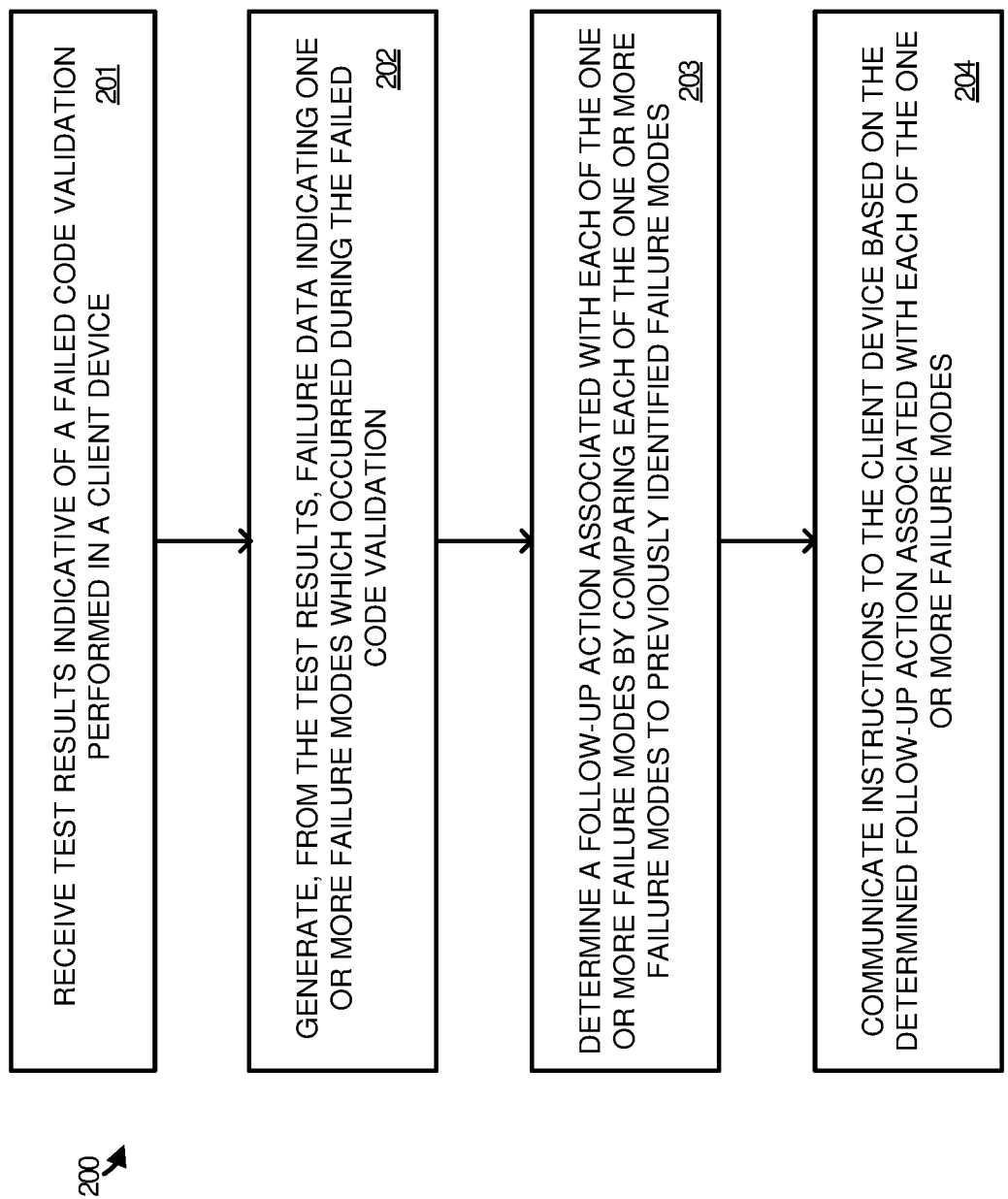
FIG. 2 illustrates an indication process employed in implementations of an enhanced application to triage test results of a failed code validation.

More particularly, FIG. 2 illustrates failure triage process 200 which, as mentioned, may be employed by failure mode service 101 to triage failure modes of a failed test validation as described herein. Some or all of the steps of failure triage process 200 may be implemented in program instructions in the context of a component or components to the application used to carry out the indication feature. The program instructions direct failure mode service 101 to operate as follows, referring parenthetically to the steps in FIG. 2 in the context of FIG. 1.

In operation, failure mode service 101 receives test results 130 indicative of a failed code validation performed in client device 110 (step 201). The tests may be run against a known and controlled code, such as the current code base. In some scenarios, these tests may be referred to as reliability runs. The tests may be run on a periodic basis or in response to a specific change to the code. For example, a developer may make a change to the code and validate their change to the code. When there is a failure in the test when run against the known, controlled code, the test may be considered to be in a known failure state. These test results 130 may then be sent to a server or server system, such as failure mode service 101, to be analyzed for persistent failures. Test results 130-132 include a test description indicating whether the test has passed or failed.

In some examples, failure mode service 101 may further determine that a duration of the failed code validation exceeds a code validation timer or a number of failure modes exceeds a failure mode threshold and responsively communicate instructions to block a retry of the failed code validation performed in the client device. For example, if the number of failure modes comprises over 3% of the test results, the test may be determined to have had a catastrophic failure and analysis of the failure modes may be terminated.

In a next operation, failure mode service 101 generates, from the test results 130, failure data indicating one or more failure modes which occurred during the failed code validation (step 202). To generate the failure data, failure mode service 101 may first normalize the test results. The normalization may include sanitizing the test results by removing specific details from the test results and then hashing the normalized code string from the test results into the failure data. The failure data my include a 32-bit code describing the failure data ("DNA"). This hashing of the test results into the failure data allows failure modes occurring at different times, in different versions of the code, in different machines, etc. to be identified and analyzed together.

Advantageously, the failure data may indicate whether the different failure modes are being repeated in different runs, even when the call stack is slightly different or when the test is run on multiple machines. For example, a machine name may be part of a test description. The machine name may then be sanitized out which allows a failure mode to look similar enough to determine that the failure is the same as another in the test results.

In a next operation, failure mode service 101 determines a follow-up action associated with each of the one or more failure modes by comparing each of the one or more failure modes to previously identified failure modes (step 203). To compare the one or more failure modes, failure mode service 101 may query a data repository, such as data repository 120 for previously identified failure modes. Failure mode service 101 may query data repository 120 by transferring the one or more failure modes to data repository 120 to compare, compare the one or more failure modes by receiving previously stored failure mode data from data repository 120, or by transferring the one or more failure modes and previously identified failure modes to an external server system or application service to compare.

In some example scenarios, the one or more failure modes may be determined to be a known failure. For example, when a developer makes a change to the code and it is determined that the failure mode is known, it can likely be determined that the failure of the test validation was not caused by the change to the code and was likely caused by some external factor to the code. In this example scenario, the follow-up action associated with the one or more failure modes would likely be a retry of the test since the failure was not a result of the change to the code itself.

In other scenarios, the failure modes may be determined to be an unknown failure. For example, when the failure mode does not match any previously recorded failure mode, it is not known why the test has failed and the failure may likely be caused by the change to the code. In this example scenario, the follow-up action associated with the one or more failure modes would be to block any retries of the test. Advantageously, this allows the test to not be retried when the likelihood of success is low. This not only saves computational time and resources, but also allows a test from unnecessarily reaching a retry limit. For example, a test may be allowed four retries before it is blocked. However, if the same failure mode is identified twice, additional retries for that failure mode may be blocked before the retry limit would have otherwise been reached.

In one example, the failure data (e.g., the DNA) which has been run on one test may be compared to failure data which has occurred on any other test. For example, when a login server is down, an identical failure mode may be identified for a large number of tests. It may then be determined that the failure has occurred as a result of the login server being down and not due to the change to the code itself. However, in other examples, the one or more failure modes may not be compared to any other test and must match a failure mode for that particular test in order to be considered known.

It some implementations, the same test case may be used to test in different environments. The test case may be run against a production environment, an internal environment, or some other type of environment. In some examples, the failure modes for different environments may be compared to identify previously known failure modes. For example, the same test may be run against Microsoft® SharePoint® and Microsoft OneNote®. Although each environment has a different type of backend, the same Application Program Interface (API). However, in other scenarios, the failure modes from one environment may not be allowed to be compared against failure modes from another environment, even when the same test cast is run. For example, a failure mode may be very specific to an online application which should not be compared to a native application. Advantageously, this allows failure modes occurring in a specific environment to be clustered and identified.

In some examples, the follow-up action associated with each of the one or more failure modes may be determined by comparing each of the one or more failure modes to previously identified failure modes having a corresponding OS type. In other examples, the follow-up action associated with each of the one or more failure modes may be determined by comparing each of the one or more failure modes to previously identified failure modes having a corresponding CPU type. In yet another example, the follow-up action associated with each of the one or more failure modes may be determined by comparing each of the one or more failure modes to previously identified failure modes having a corresponding web-based platform type. It should be noted that the test cases may be run for each of the different OS types, CPU types, and web-based platform types by including an indicator of the test case environment in the test name.

In a next operation, failure mode service 101 communicate instructions to client device 110 based on the determined follow-up action associated with each of the one or more failure modes (step 204). The instructions may be communicated to client device 110 using a retry filter in a test harness. In some scenarios, the instructions may comprise instructions to retry the failed code validation performed in client device 110. In other scenarios, the instructions may comprise instructions to block a retry of the failed code validation performed in client device 110 for the one or more failure modes.

It should be noted that in some scenarios, different failure modes may have different instructions. For example, the test may be retried for some failure modes and block for other failure modes. In another scenario, the instructions may direct client device 110 to retry the code validation in a varied manner based on the previously identified failure modes. For example, if a test continues to fail on a specific login server, failure mode service 101 may instruct client device 110 to retry the code validation on another login server. This may allow an otherwise successful retry when the root cause of the failure mode has been determined and may be mitigated using an alternated retry procedure.

Figure 3:
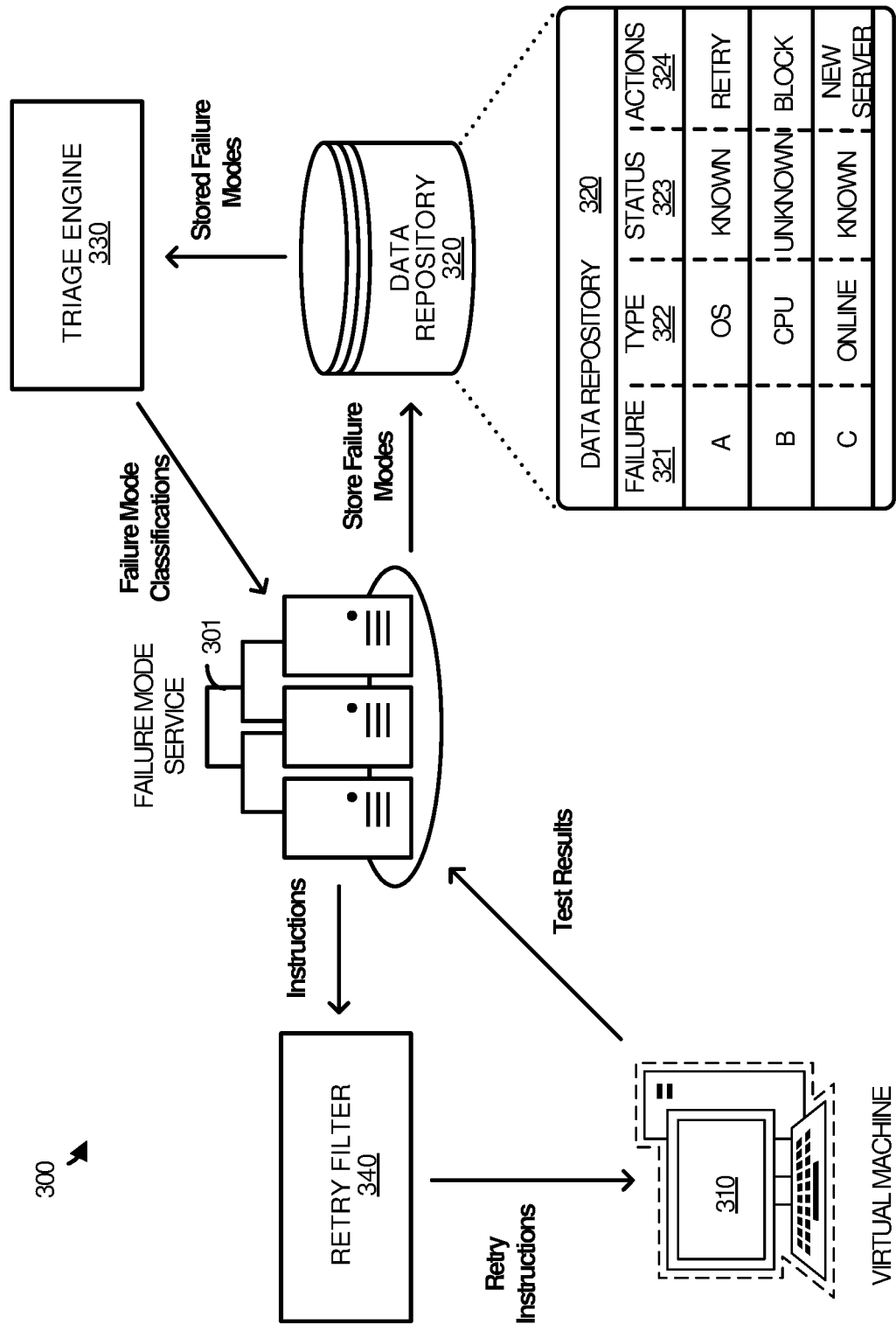
FIG. 3 illustrates an operational scenario in an implementation of an enhanced application to illustrate exemplary user interfaces in an implementation of an enhanced application to triage test results of a failed code validation.

FIG. 3 illustrates operational architecture in an implementation of an enhanced application to triage failure modes for a failed code validation. FIG. 3 illustrates an operational scenario 300 that relates to what occurs when a triage engine provides classifications for each of the failure modes based on stored failure modes. Operational scenario 300 includes failure mode service 301, virtual machine 310, data repository 320, triage engine 330, and retry filter 340. Virtual machine 310 runs tests on both reliability runs and developer code validation runs to collect test results. Data repository 320 maintains a data structure of previously reported failure modes. Triage engine 330 classifies each of the failure modes as a known or unknown failure mode. In some examples, triage engine 330 may be Azure® from Microsoft. Retry filter 340 processes instructions on whether a test should be retried or blocked.

As illustrated in the data structure for data repository 320, each stored failure mode may be associated with an environment, a status, and a follow-up action. For example, failure mode A is associated with an OS type, it is a known failure, and the follow-up action is to retry the test. On the other hand, failure mode B is associated with a CPU type, is an unknown failure, and the follow-up action indicates that the retry should be blocked for this failure. In a final failure mode C, the failure mode is associated with an online platform environment and is known. The follow-up instruction associated with failure mode C indicates that the test should be retried on another server. This may be due to the fact that there are many nondeterministic tests resulting from the server malfunctioning.

Figure 4:
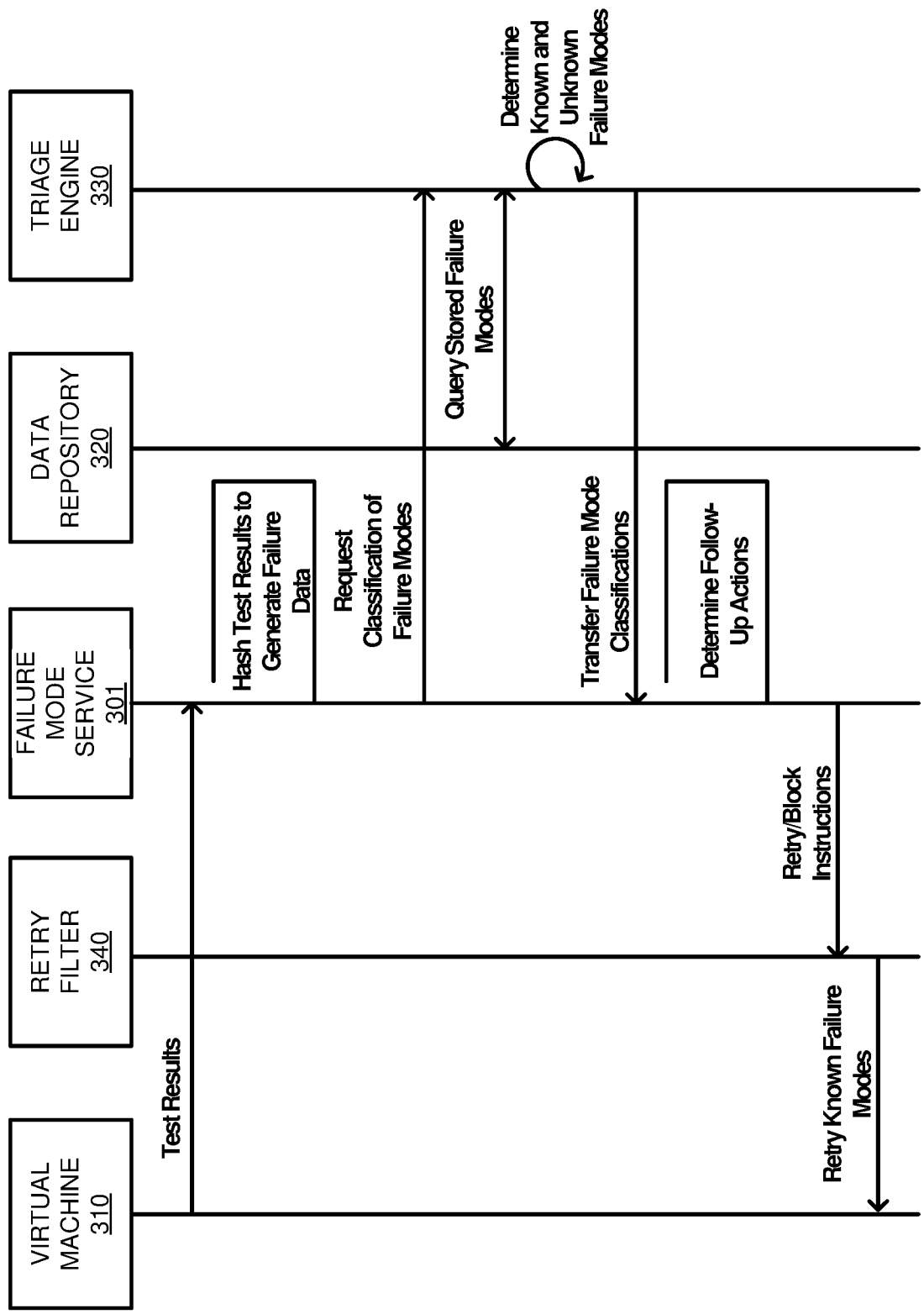
FIG. 4 illustrates exemplary user interfaces in an implementation of an enhanced application to triage test results of a failed code validation.

FIG. 4 illustrates a sequence diagram in an implementation of an enhanced application to triage failure modes for a failed code validation. The sequence diagram of FIG. 4 illustrates operations performed in accordance with the components previously described in operational scenario 300. In a first operation, failure mode service 301 receives test results from virtual machine 310. Failure mode service 301 then hashes the test results to generate failure data indicating various failure modes. Assuming the test did not time out or exceed a failure percentage threshold, failure mode service 301 then requests triage engine 330 to classify each of the failure modes.

In order to triage each of the failure modes, triage engine 330 queries data repository 320 for similarly stored failure modes. The failure modes are then compared to the similarly stored failure modes to determine whether each of the failure modes is known or unknown. The classifications are then transferred to failure mode service 301. If the classification of the failure mode is known, failure mode service 301 transfers instructions to retry filter 340 indicating that retry filter 340 should direct virtual machine 310 to retry the test for the known failure mode. If the classification of the failure mode is unknown, failure mode 301 transfers instructions to retry filter 340 indicating that retry filter 340 should block any retries of the test for the unknown failure mode. Although not illustrated in the FIG. 4, the failure modes would then be iterated and stored in data repository 320.

Figure 5:
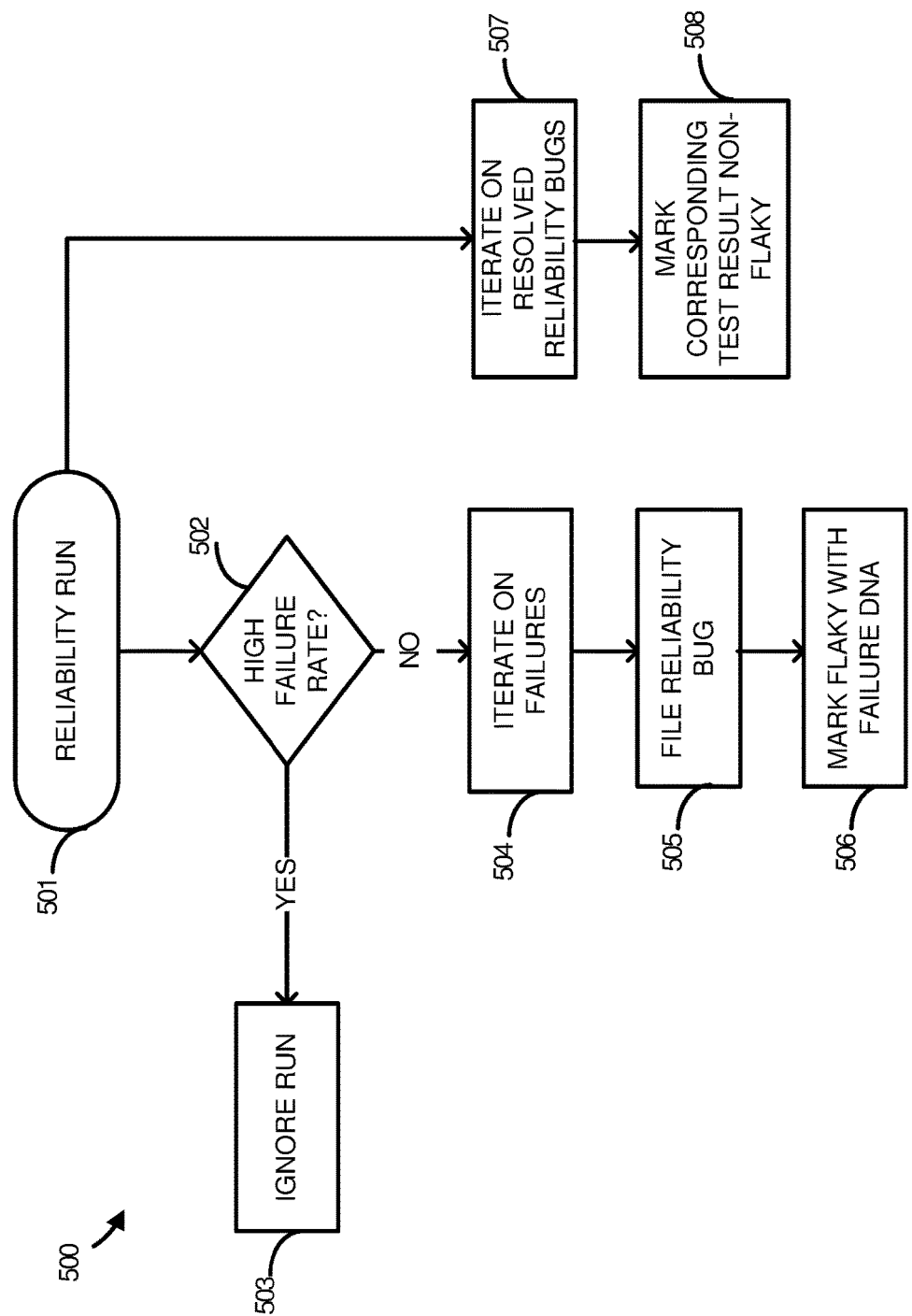
FIG. 5 illustrates a flow diagram in an implementation of an enhanced application to detect a failure mode in a reliability run.

FIG. 5 illustrates a flow diagram in an implementation of an enhanced application to detect a failure mode in a reliability run. In a first step, a reliability run is performed for post-validation analysis (step 501). The reliability run may be a Continuous Integration Test ("CIT") test. When the validation of the reliability run has been completed, the test results are run through circuit breakers. It is then determined whether the test had a high failure rate (step 502). The test may be determined to have a high failure rate if the test took a significant amount of time to complete or if there were a large number of failure modes occurring. If there is a high failure rate, it is assumed that there has been a catastrophic failure of the test (e.g., the network is down or there is a power outage) and the test results of the reliability run are ignored (step 503).

If there is not a high failure rate, each failure is iterated (step 504). In a next step, a reliability bug for each failure is filed (step 505). The auto bugging technology may dedupe each of these failures according to the test failure DNA. Therefore, a duplicate instance of a failure is not opened. Instead a comment may be added to the existing failure indicating that an additional one of the failure has occurred. If the reliability run's DNA matches an existing run's DNA, it is marked as flaky (step 506).

Therefore, a known failure that is not caused by the code may be marked as a flaky or nondeterministic test. Advantageously, the service may automatically determine that the test is flaky when a similar failure is occurring for multiple developers. Therefore, the same error is not being investigated over and over when the failure is known based on a comparison to other reliability run results.

Additionally, the service investigates the previously filed reliability bugs and determines when the failure has been fixed (step 507). If the failure has been fixed, it is removed from the filed reliability data structure and marked as no longer being flaky (508). This allows the database to be up-to-date on which failures are still considered to be flaky (i.e., a known failure) and which are determined to be an unknown failure. It should be noted that after the failure has been marked as resolved, if the same error occurs again, it will be marked as a new failure in the database since the previously marked failure has been deemed to be fixed.

Figure 6:
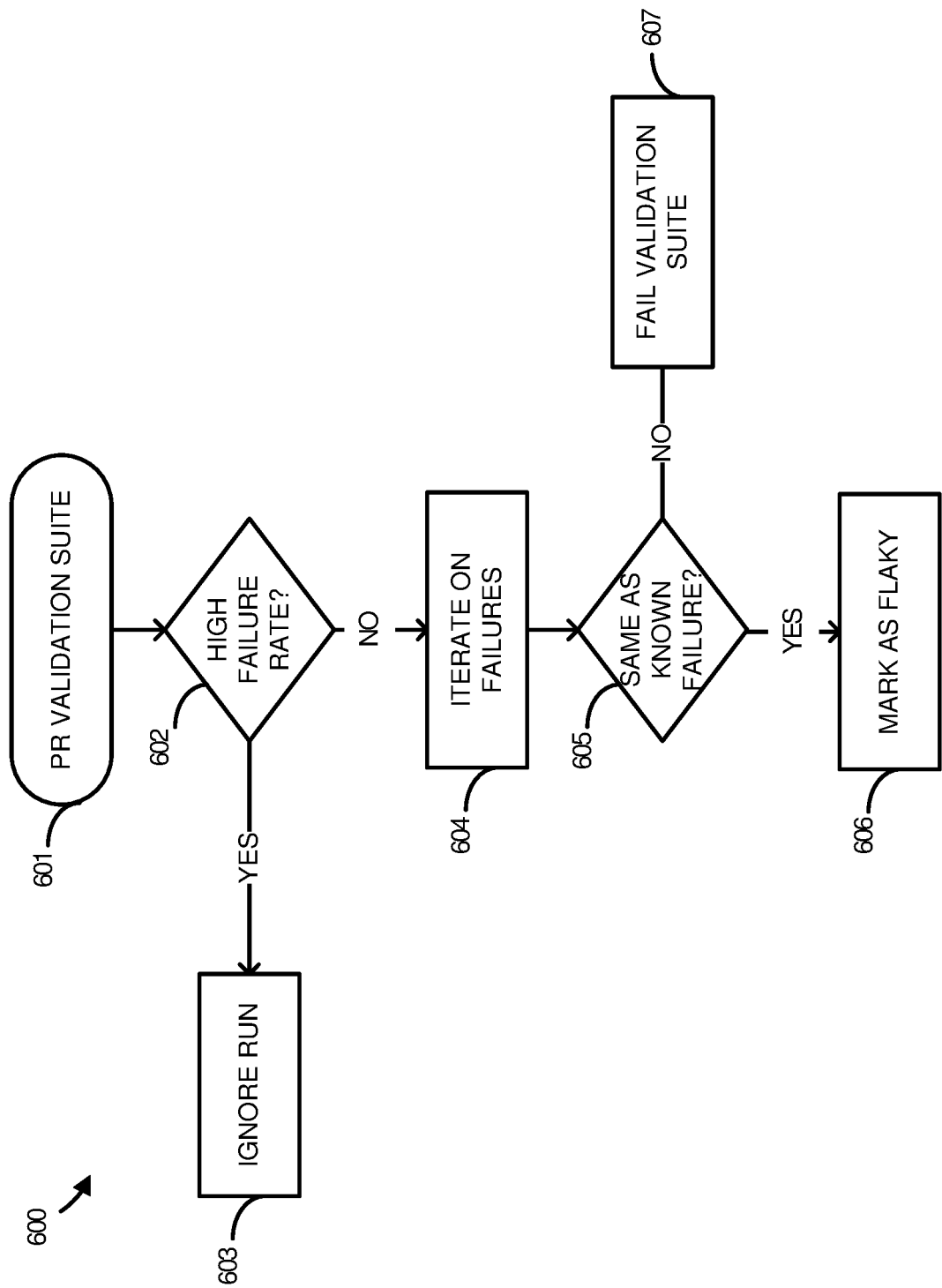
FIG. 6 illustrates a flow diagram in an implementation of an enhanced application to match a failure in a changed code validation test to a known failure in a reliability run.

FIG. 6 illustrates a flow diagram in an implementation of an enhanced application to match a failure in a changed code validation test to a known failure in a reliability run. In a first step, a Pull Request (PR) validation run is performed for post-validation analysis (step 601). When the validation of the PR run has been completed, the test results are run through circuit breakers. It is then determined whether the test had a high failure rate (step 602). The test may be determined to have a high failure rate if the test took a significant amount of time to complete or if there were a large number of failure modes occurring. If there is a high failure rate, it is assumed that there has been a catastrophic failure of the test (e.g., the network is down or there is a power outage) and the test results of the reliability run are ignored (step 603).

If there is not a high failure rate, each failure is iterated (step 604). If there is a known failure, it is marked as flaky (step 605). Therefore, a known failure that is not caused by the change to the code may be marked as a flaky or nondeterministic test. Advantageously, the service may automatically determine that the test is flaky when a known failure has occurred. The code change may then be allowed since the change was not the cause of the failure. If there is not a known failure, the validation suite fails and the change is blocked (607).

FIG. 7 illustrates computing system 701, which is representative of any system or visual representation of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes process 706, which is representative of the processes discussed with respect to the preceding FIGS. 1-6, including failure triage process 200. When executed by processing system 702 to enhance an application, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a microprocessor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing unites, application specific processors, and logic devices, as well as any other type of processing device, combination, or variation.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. Software 705 may include program instructions for implementing failure triage process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system to enhance canvas service for graphically organizing content in a user interface. Indeed, encoding software 705 on storage system 703 may transform the physical structure of storage system 703. The specific transformation of the physical structure may depend on various factors in different implementations of this description. Such factors may include, but are not limited to, the technology used to implement the storage media of storage system 703 and whether the computer-storage media are characterized as primary or secondary storage, as well as other factors.

If the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interface system 709 may also include associated user interface software executable by processing system 702 in support of the various user input and output devices discussed above.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

Example 1

A computer apparatus comprising one or more computer readable storage media; one or more processors operatively coupled to the one or more computer readable storage media; and program instructions stored on the one or more computer readable storage media that, when executed by the one or more processors, direct the one or more processors to at least: receive test results indicative of a failed code validation performed in a client device; generate, from the test results, failure data indicating one or more failure modes which occurred during the failed code validation; determine a follow-up action associated with each of the one or more failure modes by comparing each of the one or more failure modes to previously identified failure modes; and communicate instructions to the client device based on the determined follow-up action associated with each of the one or more failure modes.

Example 2

The computer apparatus of Example 1 wherein to determine the follow-up action associated with each of the one or more failure modes, the program instructions direct the one or more processors to classify each of the one or more failure modes as known or unknown by comparing each of the one or more failure modes to known failure modes.

Example 3

The computer apparatus of Examples 1-2 wherein the instructions to the client device based on the determined follow-up action associated with each of the one or more failure modes comprise instructions to block a retry of the failed code validation performed in the client device when the one or more of the failure modes is unknown.

Example 4

The computer apparatus of Examples 1-3 wherein the instructions to the client device based on the determined follow-up action associated with each of the one or more failure modes comprise instructions to retry the failed code validation performed in the client device when the one or more of the failure modes are known.

Example 5

The computer apparatus of Examples 1-4 wherein the program instructions are further configured to determine that a duration of the failed code validation exceeds a code validation timer or a number of failure modes exceeds a failure mode threshold and responsively communicate instructions to block a retry of the failed code validation performed in the client device.

Example 6

The computer apparatus of Examples 1-5 wherein to determine the follow-up action associated with each of the one or more failure modes, the program instructions direct the one or more processors to compare each of the one or more failure modes to previously identified failure modes having a corresponding Operating System (OS) type to determine the follow-up action associated with each of the one or more failure modes.

Example 7

The computer apparatus of Examples 1-6 wherein to determine the follow-up action associated with each of the one or more failure modes, the program instructions direct the one or more processors to compare each of the one or more failure modes to previously identified failure modes having a corresponding Central Processing Unit (CPU) type to determine the follow-up action associated with each of the one or more failure modes.

Example 8

The computer apparatus of Examples 1-7 wherein to determine the follow-up action associated with each of the one or more failure modes, the program instructions direct the one or more processors to compare each of the one or more failure modes to previously identified failure modes having a corresponding web-based platform type to determine the follow-up action associated with each of the one or more failure modes.

Example 9

The computer apparatus of Examples 1-8 wherein to generate the failure data from the test results, the program instructions direct the one or more processors to normalize the test results by removing instant specific details from the test results and hash the normalized test results to provide the failure data indicating the one or more failure modes which occurred during the failed code validation.

Example 10

A method comprising: receiving test results indicative of a failed code validation performed in a client device; generating, from the test results, failure data indicating one or more failure modes which occurred during the failed code validation; determining a follow-up action associated with each of the one or more failure modes by comparing each of the one or more failure modes to previously identified failure modes; and communicating instructions to the client device based on the determined follow-up action associated with each of the one or more failure modes.

Example 11

The method of Example 10 wherein determining the follow-up action associated with each of the one or more failure modes comprises classifying each of the one or more failure modes as known or unknown by comparing each of the one or more failure modes to known failure modes.

Example 12

The method of Examples 10-11 wherein the instructions to the client device based on the determined follow-up action associated with each of the one or more failure modes comprise instructions to block a retry of the failed code validation performed in the client device when the one or more of the failure modes is unknown.

Example 13

The method of Examples 10-12 wherein the instructions to the client device based on the determined follow-up action associated with each of the one or more failure modes comprise instructions to retry the failed code validation performed in the client device when the one or more of the failure modes are known.

Example 14

The method of Examples 10-13 further comprising determining that a duration of the failed code validation exceeds a code validation timer or a number of failure modes exceeds a failure mode threshold and responsively communicating instructions to block a retry of the failed code validation performed in the client device.

Example 15

The method of Examples 10-14 wherein determining the follow-up action associated with each of the one or more failure modes comprises comparing each of the one or more failure modes to previously identified failure modes having a corresponding Operating System (OS) type to determine the follow-up action associated with each of the one or more failure modes.

Example 16

The method of Examples 10-15 wherein determining the follow-up action associated with each of the one or more failure modes comprises comparing each of the one or more failure modes to previously identified failure modes having a corresponding Central Processing Unit (CPU) type to determine the follow-up action associated with each of the one or more failure modes.

Example 17

The method of Examples 10-16 wherein determining the follow-up action associated with each of the one or more failure modes comprises comparing each of the one or more failure modes to previously identified failure modes having a corresponding web-based platform type to determine the follow-up action associated with each of the one or more failure modes.

Example 18

The method of Examples 10-17 wherein to generate the failure data from the test results, the program instructions direct the one or more processors to normalize the test results by removing instant specific details from the test results and hash the normalized test results to provide the failure data indicating the one or more failure modes which occurred during the failed code validation.

Example 19

One or more computer readable storage media having program instructions stored thereon, wherein the program instructions, when executed by one or more processors, direct the one or more processors to at least: receive test results indicative of a failed code validation performed in a client device; generate, from the test results, failure data indicating one or more failure modes which occurred during the failed code validation; classify each of the one or more failure modes as known or unknown by comparing each of the one or more failure modes to known failure modes; and communicate instructions to the client device based on the determined follow-up action associated with each of the one or more failure modes.

Example 20

The one or more computer readable storage media of Example 19 wherein the instructions to the client device based on the determined follow-up action associated with each of the one or more failure modes comprise instructions to block a retry of the failed code validation performed in the client device when the one or more of the failure modes is unknown and instructions to retry the failed code validation performed in the client device when the one or more of the failure modes are known.

The invention claimed is:

1. A computer apparatus comprising:
one or more computer readable storage media;
one or more processors operatively coupled to the one or more computer readable storage media; and
program instructions stored on the one or more computer readable storage media that, upon execution by the one or more processors, direct the one or more processors to at least:
receive test results indicative of a failed code validation performed in a client device;
generate, from the test results, failure data indicating one or more failure modes which occurred during the failed code validation;
determine a follow-up action associated with each of the one or more failure modes by comparing each of the one or more failure modes to previously identified failure modes, wherein the program instructions to determine the follow-up action comprise program instructions that, upon execution by the one or more processors, direct the one or more processors to at least:
classify each of the one or more failure modes as known or unknown by comparing each of the one or more failure modes to known failure modes; and
communicate instructions to the client device based on the determined follow-up action associated with each of the one or more failure modes, wherein the program instructions to communicate instructions to the client device comprise program instructions that, upon execution by the one or more processors, direct the one or more processors to at least:
block a retry of the failed code validation performed in the client device based on a determination that one or more of the one or more failure modes is classified as unknown.

2. The computer apparatus of claim 1 wherein the program instructions to generate the failure data comprise program instructions that, upon execution by the one or more processors, direct the one or more processors to at least:
normalize the test results.

3. The computer apparatus of claim 2 wherein the program instructions to normalize the test results comprise further instructions that, upon execution by the one or more processors, direct the one or more processors to:
sanitize the test results by removing specific details from the test results to generate a normalized code string.

4. The computer apparatus of claim 3 wherein the program instructions to normalize the test results comprise further instructions that, upon execution by the one or more processors, direct the one or more processors to at least:

hash the normalized test results to provide the failure data indicating the one or more failure modes which occurred during the failed code validation.

5. The computer apparatus of claim 1 wherein the program instructions to communicate instructions to the client device comprise program instructions that, upon execution by the one or more processors, direct the one or more processors to at least:

retry the failed code validation performed in the client device based on a determination that one or more of the one or more failure modes are known.

6. The computer apparatus of claim 1 wherein the program instructions comprise further program instructions that, upon execution by the one or more processors, direct the one or more processors to at least:

in response to a determination that a duration of the failed code validation exceeds a code validation timer or a number of failure modes exceeds a failure mode threshold, communicate instructions to block a retry of the failed code validation performed in the client device.

7. The computer apparatus of claim 1 wherein the program instructions to determine the follow-up action comprise program instructions that, upon execution by the one or more processors, direct the one or more processors to at least:

compare each of the one or more failure modes to previously identified failure modes having a corresponding Operating System (OS) type to determine the follow-up action associated with each of the one or more failure modes.

8. The computer apparatus of claim 1 wherein the program instructions to determine the follow-up action comprise program instructions that, upon execution by the one or more processors, direct the one or more processors to at least:

compare each of the one or more failure modes to previously identified failure modes having a corresponding Central Processing Unit (CPU) type to determine the follow-up action associated with each of the one or more failure modes.

9. The computer apparatus of claim 1 wherein the program instructions to determine the follow-up action comprise program instructions that, upon execution by the one or more processors, direct the one or more processors to at least:

compare each of the one or more failure modes to previously identified failure modes having a corresponding web-based platform type to determine the follow-up action associated with each of the one or more failure modes.

10. A method comprising:

receiving test results indicative of a failed code validation performed in a client device;

generating, from the test results, failure data indicating one or more failure modes which occurred during the failed code validation;

determining a follow-up action associated with each of the one or more failure modes by comparing each of the one or more failure modes to previously identified failure modes, wherein the determining the follow-up action comprises classifying each of the one or more failure modes as known or unknown by comparing each of the one or more failure modes to known failure modes; and communicating instructions to the client device based on the determined follow-up action associated with each of the one or more failure modes, wherein communicating instructions to the client device comprises blocking a retry of the failed code validation performed in the client device based on a determination that one or more of the one or more failure modes is classified as unknown.

11. The method of claim 10 wherein generating the failure data comprises normalizing the test results.

12. The method of claim 11 wherein normalizing the test results comprises sanitizing the test results by removing specific details from the test results to generate a normalized code string.

13. The method of claim 12 wherein normalizing the test results further comprises hashing the normalized test results to provide the failure data indicating the one or more failure modes which occurred during the failed code validation.

14. The method of claim 10 wherein the instructions to the client device comprise instructions to retry the failed code validation performed in the client device based on a determination that one or more of the one or more failure modes are known.

15. The method of claim 10 further comprising:

in response to determining that a duration of the failed code validation exceeds a code validation timer or a number of failure modes exceeds a failure mode threshold, communicating instructions to block a retry of the failed code validation performed in the client device.

16. The method of claim 10 wherein determining the follow-up action comprises comparing each of the one or more failure modes to previously identified failure modes having a corresponding Operating System (OS) type to determine the follow-up action associated with each of the one or more failure modes.

17. The method of claim 10 wherein determining the follow-up action comprises comparing each of the one or more failure modes to previously identified failure modes having a corresponding Central Processing Unit (CPU) type to determine the follow-up action associated with each of the one or more failure modes.

18. The method of claim 10 wherein determining the follow-up action comprises comparing each of the one or more failure modes to previously identified failure modes having a corresponding web-based platform type to determine the follow-up action associated with each of the one or more failure modes.

19. One or more computer readable storage media having program instructions stored thereon, wherein the program instructions, when executed by one or more processors, direct the one or more processors to at least:

receive test results indicative of a failed code validation performed in a client device;

generate, from the test results, failure data indicating one or more failure modes which occurred during the failed code validation;

determine a follow-up action associated with each of the one or more failure modes by comparing each of the one or more failure modes to previously identified failure modes, wherein the program instructions to determine the follow-up action comprise program instructions that, upon execution by the one or more processors, direct the one or more processors to at least:

classify each of the one or more failure modes as known or unknown by comparing each of the one or more failure modes to known failure modes; and communicate instructions to the client device based on the determined follow-up action associated with each of the one or more failure modes, wherein the program instructions to communicate instructions to the client device comprise program instructions that, upon execution by the one or more processors, direct the one or more processors to at least:
  block a retry of the failed code validation performed in the client device based on a determination that one or more of the one or more failure modes is classified as unknown.

20. The one or more computer readable storage media of claim 19 wherein the program instructions to generate the failure data comprise program instructions that, upon execution by the one or more processors, direct the one or more processors to at least normalize the test results.

* * * * *